United States Patent
Drager

(10) Patent No.: US 6,260,833 B1
(45) Date of Patent: Jul. 17, 2001

(54) FAIL SAFE COIL SPRING INCLUDING MOUNTING MECHANISM

(76) Inventor: Barry Drager, 7042 Long Dr., Houston, TX (US) 77087

( * ) Notice: Subject to any disclaimer, the term of this patent is extended or adjusted under 35 U.S.C. 154(b) by 0 days.

(21) Appl. No.: 09/488,873

(22) Filed: Jan. 21, 2000

(51) Int. Cl.$^7$ ...................................................... F16F 1/00
(52) U.S. Cl. ............................ 267/72; 267/169; 267/179
(58) Field of Search ................................ 267/69, 70, 71, 267/169, 179, 150, 72

(56) References Cited

U.S. PATENT DOCUMENTS

| | | | |
|---|---|---|---|
| 1,194,417 | * 8/1916 | Pelham | 267/72 |
| 1,388,241 | * 8/1921 | Dierking | 267/70 |
| 2,120,528 | * 6/1938 | Purweet | 267/72 |
| 4,057,235 | * 11/1977 | Halopoff | 267/73 |
| 5,624,321 | * 4/1997 | Snyder | 472/118 |
| 5,810,339 | * 9/1998 | Kuspert et al. | 267/293 |
| 6,098,970 | * 8/2000 | Lowe | 267/179 |

* cited by examiner

*Primary Examiner*—Robert J. Oberleitner
*Assistant Examiner*—Xuan Lan Nguyen
(74) *Attorney, Agent, or Firm*—Bracewell & Patterson, L.L.P.

(57) ABSTRACT

This disclosure sets out an improved coil spring responding in compression to a tensile load. The load is applied by load engaging equal and oppositely deployed hooks wherein both hooks have a load engaging throat at the lower end connected with a pair of parallel legs. One leg terminates in a hanger having the form of a J-shaped hook and the other leg terminates in a protruding eyelet sized to engage a tang at the end of the spring. The two hooks are maintained at approximate right angles with respect to each other to distribute the forces more evenly in the coil spring to avoid spring bowing.

19 Claims, 2 Drawing Sheets

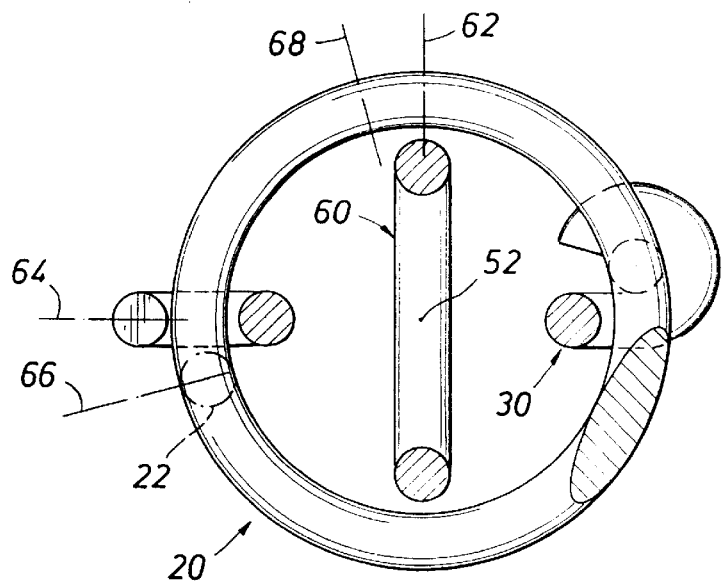
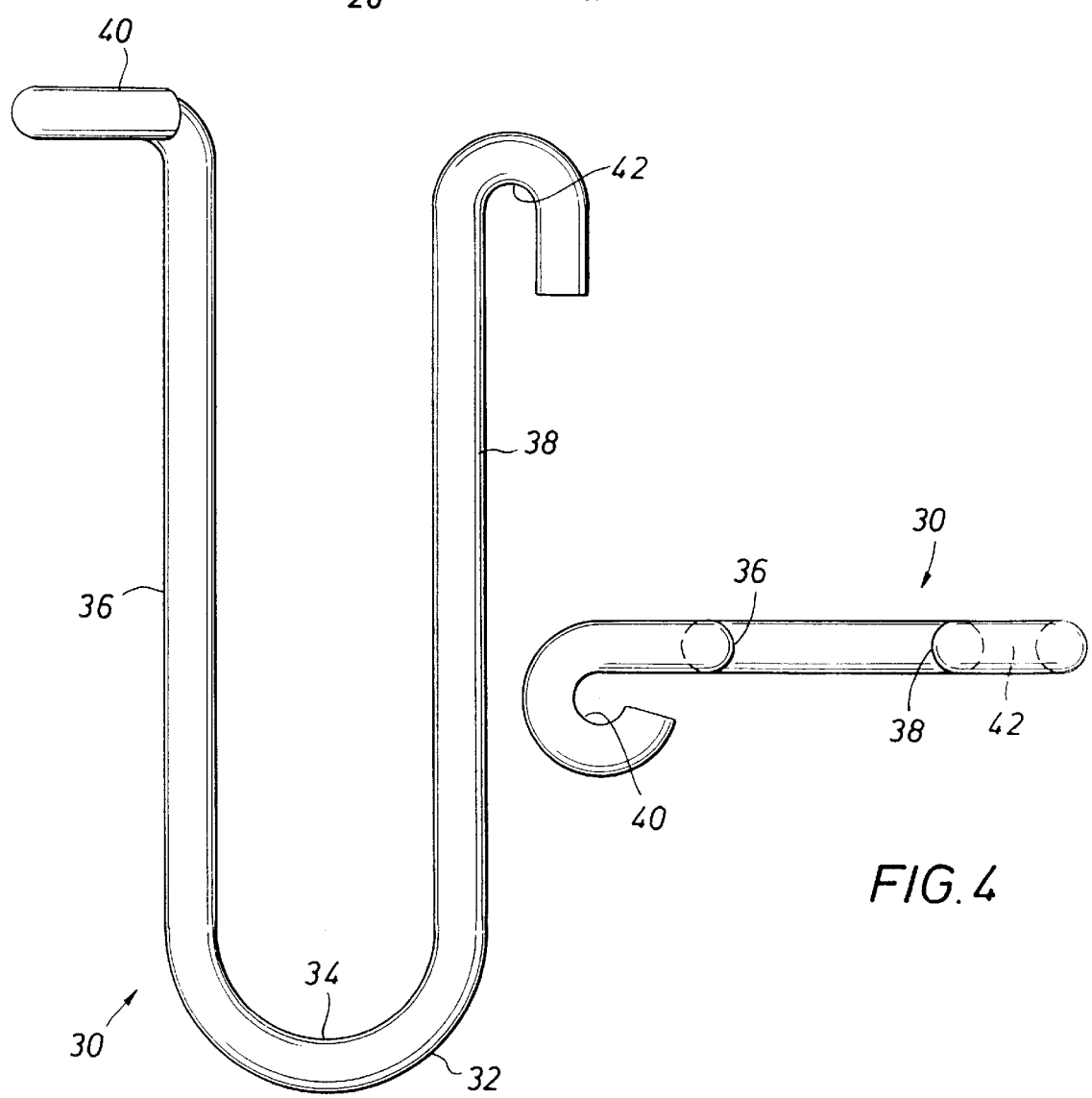
FIG. 3
FIG. 5
FIG. 4

FAIL SAFE COIL SPRING INCLUDING MOUNTING MECHANISM

BACKGROUND OF THE INVENTION

The present disclosure is directed to a coil spring mounting mechanism which accommodates catastrophic failure of the coil spring. It is especially directed to coil springs which are used in taut cables or other load bearing conditions. Consider a cable having a specific load placed on it, such as 1,000 pounds. When the cable is pulled taut, equipment which is connected to the cable is subjected to severe shock loading in the event of unintended jerking on the cable. This is especially true with cables that anchor elevators, i.e., the dead end of the cable. Also, it can be used to support heavy equipment which is subject to periodic bumping. For instance, in a mechanism moving on a track to the dead end, it is desirable that a bumper intercept the load at the end of the track. If the bumper itself is suspended by a cable, one or many, then the shock of the load on the cable creates shock loading damage. In other instances, where a device is being towed, there may be a constant variation in tow bar load which periodically places shock in the towing equipment, just as in the bumpers noted above.

There are many situations where this shock load is relieved by installing a shock absorber in the cable. For instance, at a dead end connection of a cable in a drilling rig, it is highly desirable to smooth out shock loading. This can be done by installing a coil spring to be compressed with load. If, however, the coil spring and the support mechanism which connects the coil spring in the dead end connection were to fail and thereby separate failed components, then the dead end might break free, a highly undesirable result. There are devices available for the moment which accomplish this. By and large, they have the form of a coil spring which is mounted in a heavy gauge, durable cage of forged or cast construction. Such a cage, while effective for the purpose, is difficult to install and is rather costly to fabricate. Therefore, the present disclosure sets forth a cable dead end connection system (to pick just one application among many) to thereby enable the cable dead end to be spring mounted and yet provides assurance that it is a fail safe connection, i.e., even on catastrophic failure of the spring and other equipment, it does not "let go" of the cable dead end. The cable will remain intact and its desired connection will survive even the prospective catastrophic failure of the equipment of this disclosure.

Assume for purposes of explanation that the dead end of a cable is clamped or otherwise connected to an immovable object, i.e., through an eyelet looped around a bolt. Assume further that the free end of the cable is subjected to shock loading. While the stroke may not be great, the shock loading can cumulatively wear the cable so that the cable requires replacement. By the incorporation of a coil spring serially compressed by cable motion, to a major extent, shock loading can be reduced, cable life can be extended, and shock can be absorbed so that the loads supported by the cable are handled more smoothly both in dynamic and static situations. This equipment is a device which guides the spring so that it is regularly compressed.

Spring compression normally contemplates that an axial load is applied to the spring and that the multiple turns of the spring are compressed with a relatively even application. So to speak, the spring ends are compressed in parallel, and extend in parallel, and are maintained parallel at all points in operation. This parallel position of the two ends prevents the spring from bowing out to the side. The spring will tend to bow to the side when loaded unevenly. The equipment of this disclosure sets forth a spring loading safety link which is a fail safe mechanism that assures that the spring is hooked and held for compressive loading without bowing to the side. The value of this tension load compressing the spring without bowing will be noted in careful detail below.

SUMMARY OF THE INVENTION

This disclosure sets out a compressively loaded coil spring which is constructed with a number of turns and which terminates at each end of the spring with protruding tangs. The position of the tangs with respect to each other will be noted in careful detail below. The coil spring is held by a pair of mated hooks. The two hooks are essentially identical and differ only in positioning. One will be labeled the top hook and the other will be defined as the bottom hook. The top and bottom hooks are U-shaped bars which are inserted into each other on the interior of the coil spring. The respective hooks terminate in outwardly bent partial eyelets which encircle the respective tangs. There is one tang at the top end and one at the bottom end of the coil spring, and each hook is constructed so that the eyelet grabs the tang at one end. The hooks are deployed at approximate right angles to each other so that the two hooks position protruding cable eyelets suitable for cable connection. Under load, the hooks are pulled apart, but because they connect at the opposite ends of the coil spring, the two hooks apply equal and opposite compressive loads. One valuable feature of the disclosed mechanism is that the hooks are in planes approximately at right angles with respect to each other, and this in turn alignment is maintained so that the hooks do not apply forces that bow, buckle or bend the coil spring. This alignment of the respective hooks assures that parallel loading is applied to the two ends of the coil spring. In the absence of this equipment, the coil spring would tend to bow and fail much more rapidly as a result of bowing to the side.

BRIEF DESCRIPTION OF THE DRAWINGS

So that the manner in which the above recited features, advantages and objectives of the present invention to be attained can be understood in detail, more particular description of the invention, briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

FIG. 3 is a side view of the hook of the present disclosure showing a U-shaped two legged hook terminating at a tang engaging eyelet on one leg;

FIG. 4 is an end view of the hook shown in FIG. 3; and

FIG. 5 is an enlarged sectional view taken along the line 5—5 of FIG. 1 of the drawings.

DETAILED DESCRIPTION OF THE PREFERRED EMBODIMENTS

Figure 1:
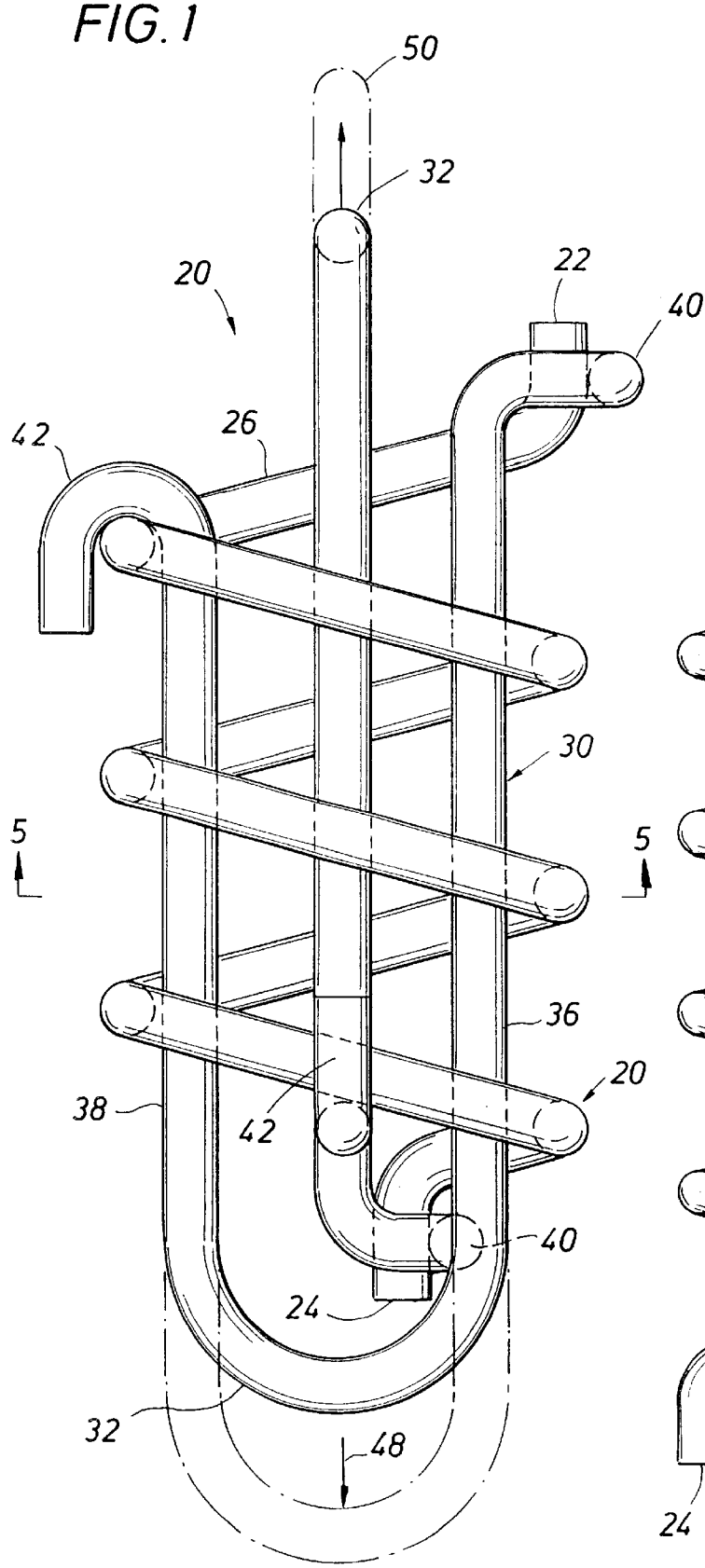
FIG. 1 is a view showing a coil spring engaged with a pair of oppositely deployed hooks in accordance with the teachings of the present disclose.

Attention is directed to FIG. 1 of the drawings where the numeral 10 indicates and identifies the assembled structure of the present disclosure. It is a fail safe mechanism. It incorporates a coil spring 20 which will be detailed first. The coil spring 20 is cooperative with identical hooks 30. The hooks will be described in detail after description of the coil spring.

Figure 2:
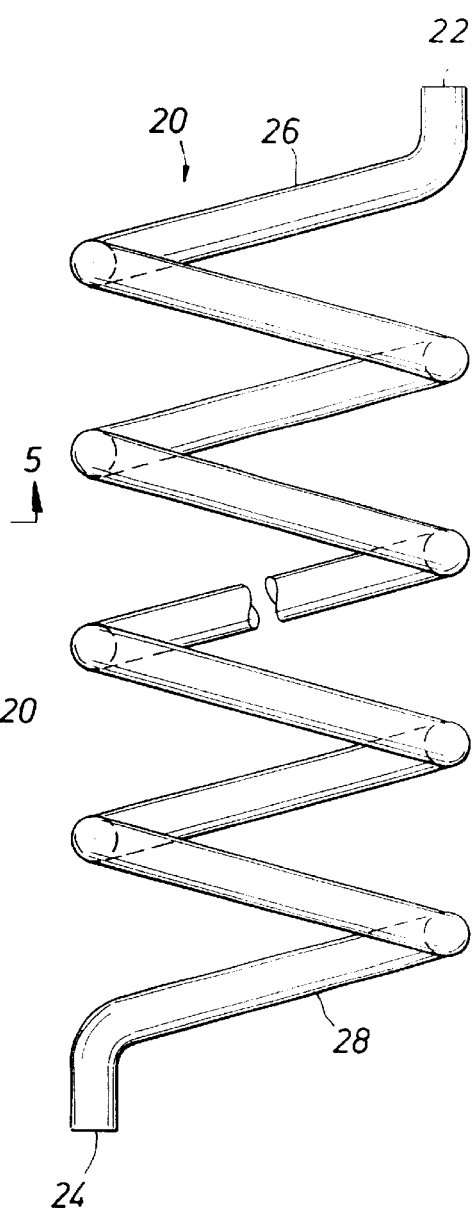
FIG. 2 is a side view of a coil spring with end located tangs which are at specific angular locations as will be described.

Attention is momentarily directed to FIG. 2 of the drawings where the coil spring 20 is shown in greater detail and is free in engagement with the other components. The coil spring is wound of a certain diameter bar stock, and is assembled into one or more helical turns (the quantity will be defined below) so that it has a right cylindrical construction in the unloaded state. The bar stock which forms the coil spring is trimmed when it is cut free of the feed bar stock. It is cut and trimmed so that it has a protruding tang 22 at one end and a comparable and similar protruding tang 24 at the opposite end. FIG. 2 shows the tang 22 on the right and a casual reading of FIG. 2 would seem to imply that the tang 24 is spaced at 180 degrees around the circle of the spring from the other tang. In fact, that is not a correct understanding. The position of the two tangs with respect to each other will be reviewed more carefully. That review will correlate the position of the two tangs to the two hooks 30 which are used to assemble the completed device 10.

Going now in particular to FIG. 2 of the drawings, the first turn will be identified generally at 26 and the last turn will be identified generally at 28. The first and last turns conform to the uniform diameter of the coil spring and they especially represent a portion which is used to support the hooks, as will be described. To this end, the total or aggregate number of turns in the coil spring can be initially selected for the construction of the coil spring. The coil spring is manufactured in the usual fashion. It is made of appropriate metal stock for long life. In accordance with typical spring life calculations, the spring is designed so that it has essentially an indefinite life and is able to absorb in excess of some designated number of flexures during use. Indeed, it is not uncommon to make this spring where it will absorb perhaps 100 million flexures. Notwithstanding design of the spring to accommodate even 1,100 million flexures, there are occasions where the spring will break. The hooks enable the spring to break and yet will retain the components in the assembled relationship without dropping the load. In other words, even in the face of catastrophic failure, occasioned by breakage of the coil spring, the load is not dropped or released.

The coil spring is formed of a multiple set of turns. It can be generally indicated that the coil spring has N turns where N is a whole number positive integer. However, it must be observed that there is a fraction of a turn in the spring, i.e., the end located parallel tangs 22 and 24 are not coincident with each other when viewed in a circle. An end view of the spring is found in FIG. 5 and some discussion associated with that view will make clear how the tangs are not aligned, but they are specifically positioned to achieve a desired angular relationship.

The top turn 26 presents an engaging area for one of the hooks while the bottom turn 28 provides an engaging area for the second hook. Recall that the two hooks are identical; they are different in function and this derives from their opposite modes of orientation and installation. Moreover, and building on this example, assume that the top turn 26 and the bottom turn 28 are constructed with a common lead. Assume also that they are constructed of bar stock of a specified and uniform diameter, i.e., the coil spring 20 has the same bar stock diameter. Hence, the term diameter is used below will refer to the diameter of the fabricated spring, not the bar stock. The term bar diameter will refer to the stock itself prior to fabrication as a spring.

The spring construction is in all aspects typical or conventional. The spring is made with essentially uniform helical turns and is made to a common diameter. The tangs are bent upwardly so they extend parallel to the spring axis. Moreover, the top and bottom turns 26 and 28 provide seats for the hooks, as will be described.

Attention is now directed to FIG. 3 of the drawings where the hook 30 is illustrated. There will be a second hook used. They differ only in position. Accordingly, a description of one hook referring to FIGS. 3 and 4 jointly will suffice. The hook 30 is a U-shaped mounting bracket. It has a lower end 32 which defines a cable eyelet at the throat 34. A wire rope including an eyelet is hooked or latched at the throat 34. This places a load on the hook. Because there are two legs 36 and 38 in the hook construction, the legs 36 and 38 carry approximately one half of the load which is applied at the eyelet region 34. The hook is made to a specified length. At the upper end, there is a tang engaging eyelet 40 which is bent into a circular configuration as better illustrated in FIG. 4. There is a second end to the hook which is bent over thereby defining a hanger 42. The functions of the tang eyelet 40 and the hanger 42 will be described later in conjunction with assembly of the equipment.

Going first to the eyelet 40, it is turned out so that it forms an eyelet which is sized to fit around the tang 22. The second hook, of course, is hooked around the tang 24. Because the bar stock making up the coil is essentially uniform in diameter from one end to the other, the two eyelets are essentially equal because they engage equal thickness tangs. The tangs 22 and 24 need sufficient length so that they extend into the partially encircling eyelet 40. It is not essential that the eyelet fully enclose the tang. What is helpful is construction of the eyelets so that the eyelets hold around the tangs without further rotating. Equally, the hanger 42 on the opposite side or leg of the hook must reach over the top turn 26 for one hanger and reach over the bottom turn 28 for the other hanger. In both instances, the throat of the hanger 42 preferably is slightly wider than the diameter of the bar stock forming the coal spring. This permits slight clearance. This avoids pinching. This avoids binding. Telescoping movement of the coil spring in the hangers 42 is thus permitted.

Assume that a wire rope is looped through the throat 34 on the hook. The load applied at that point is evenly distributed between the two legs 36 and 38. Approximately, one half of the load is placed on each leg. Accordingly, the hook is loaded in tension in its operation, but it does not flex like the material used in the coil spring. For that reason, the hook material is different, i.e., it is made of materials which are less ductile and there is no flexure in the hook. The hook construction materials are therefore chosen from a different set of metal alloys.

Attention is now directed back to FIG. 1 of the drawings which shows the eyelet 40 engaging the tang 22. The hook is assembled by pushing it down from the top into the coil spring. The hook must have sufficient length that the second hook (of equal length) is able to be passed through the throat 34. The two hooks together have sufficient length so that they extend fully through the coil spring and are aligned at the respective ends of the coil spring. This is shown in part in FIG. 1 where the eyelet 40 engages or holds the tang 22. The top turn engages the hanger 42. The hanger 42 is hung over the top turn. This positions the two legs 36 and 38 approximately parallel to the centerline axis of the coil spring.

FIG. 1 includes an arrow 48 which represents an axial load applied to the pair of hooks. As will be understood, an equal and opposite load is applied at the opposite end. It is noteworthy to observe the movement of the hooks with respect to each other. To this end, there is a second position of the second hook 50 shown in FIG. 1 where the excursion of that hook is implied. In other words, one hook will move axially upwardly or downwardly with respect to the other. This occurs when load forces are applied in the fashion of the load 48 commonly applied with a wire rope. By appropriate proportioning of the components, when such forces 48 are applied equally and oppositely to the two hooks, a compressive force is placed on the coil spring 20. This will be understood better now by referring to FIG. 5 of the drawings.

In FIG. 5, the coil spring 20 is shown to be essentially circular in construction. There is a centerline axis 52 for the coil spring. FIG. 5 shows a sectional view of the coil spring stock on the right, and shows one of the tangs in dotted line at the left. For purposes of discussion, it can be either tang, and it will be assumed in this instance to be the top tang 22. The position of the bottom tang 24 with respect to the top tang will be developed.

FIG. 5 also shows the hook 30 at a particular orientation within the coil spring 20. For nomenclature, the second hook will be described as the hook 60, it being understood that the hooks 30 and 60 are identical in construction and differ in their position with respect to the coil spring. Each hook is like the other except they are inverted with respect to each other.

The numeral 62 identifies a plane coincident with the second hook 60. This plane is shown in FIG. 5 to be a right angles with respect to the plane for the hook 30. That plane 64 is also shown in FIG. 5. The planes 62 and 64 are used for reference purposes. The two planes are illustrated at right angles. Maintaining this right angle relationship is noteworthy, as will be explained.

The hook 30 is held in the plane 64 by engaging the eyelet 40 with the tang 22. This hook angular orientation is therefore fixed by the tang location. The cooperative eyelet 40 is set off to the side. By turning it to the side, it is able to reach over the tang and hold it, thereby fixing location in the plane 64. This common construction is repeated for the other hook 60. The tang 22 is at an offset angle indicated by the line 64 in FIG. 5. The included angle between the planes 64 and 66 is defined by the extent or the measure to which the eyelet 40 is to the side. A comparable offset angle is included for the second hook 60. To that end, as illustrated in this particular drawing that is an angle of about 17 degrees. That is not a mandated angle. The offset angle for the second tang is preferably the same and to that end, the plane 68 is offset by that amount. As will be understood, the tang 24 is therefore offset to the side of the hook 60. Thus, the plane 68 is used to locate the tang centered in the plane 68.

From the foregoing, it will be observed that the use of equal offsets of the eyelets to engage the two respective tangs results in a location of the two tangs at 90 degrees spacing between the two. This is intuitively supported by the understanding that the two hooks are offset by 90 degrees from each other so that they are deployed at right angles. This preserves the right angle relationship which is best illustrated in FIG. 5, namely, that the hooks 30 and 60 operate in the same way and apply loading in the same fashion on the upper and lower turns of the coil spring.

Consider now the value of this loading so that the coil spring 20 is not bowed in operation. Absent this alignment, and assuming that the two hooks were jammed against each other so that the included angle of the respective planes was perhaps only 10 or 15 degrees, the loading would be applied to the coil spring at the points of contact of the two hooks with respect to the top and bottom turns and would cause bowing of the coil spring. Then, with vibration or shock loading, the coil spring would flex in a bowed state. When that occurs, failure of the coil spring occurs much sooner. That portion of the helical turn that is on the outside of the bow will have a greater excursion, and metal fatigue is more likely to occur in that region. This is detrimental to operation. By positioning the two hooks at right angles as best illustrated in FIG. 5, the two hooks support the load on the coil spring in such a fashion that bowing is not possible. Bowing is by the invention.

It is preferred to use the tangs and eyelets to align the two hooks. This permits easier assembly and keeps the hooks joined to the ends of the coil spring in a more desirable fashion. The eyelet on one leg and the hanger on the opposite leg are constructed so that they merely slip on and off of the coil spring. By assembly with that kind of eyelet and hanger, binding at the time of use is held to a minimum.

Assume, in a worst case condition, that the coil spring fails in some fashion. Assume that the coil spring breaks anywhere from top to bottom and assume also that it breaks with a catastrophic failure. When such failure occurs, and for whatever reason, the turns of the coil spring still remain around the two hooks. While the amount of flexure in the system may be reduced and the dynamics of the coil spring may suffer, still, the two hooks remain connected and do not separate thereby dropping the dead end connection of the cable. In other words, the cable connection holds. While the catastrophic failure might result in modest elongation, it will not drop the dead end with catastrophic risk.

Note should be taken of the relative stock involved. The stock making up the coil spring can be circular or oval, or flat. The cross sectional area of the stock of the coil spring can be typically less than the cross sectional area of the hooks. Keeping in mind that the hooks include four legs so that the loading on each leg is reduced by 75% (each leg carrying 25% of the load), the stock used to fabricate the hooks can be relatively thin by comparison. Again, however, these are scale factors which can be adapted depending on the load in the circumstances of use.

Consider now the possibility of misalignment of the two hooks 30 and 60. If there were no tangs to serve as alignment tabs, the two hooks could easily wiggle and jiggle until one is rotated against the other and the two hooks are no longer at right angles. The right angle relationship is highly desirable. If that is lost, there is some measure of risk and much more rapid wear and tear on the coil spring 20.

The hook construction, with an eyelet on one side and the hanger on the other side, works well with flat stock spring material. Also, it works quite well with a spring where the top and bottom turns are ground flat for some portion of the end turns. However, grinding flat is normally used only where the coil spring bears against a flat plate, and that is missing in this instance so there is no need commonly to grind the ends of the spring flat.

While the foregoing is directed to the preferred embodiment, the scope is determined by the claims which follow:

What is claimed is:

1. A spring system subjected to compressive loading in a tension system comprising:

(a) a coil spring constructed of multiple turns of spring stock material ending in end located tangs, the coil spring defining an axis and the tangs substantially parallel with the axis; and (b) a pair of similar hooks having a load engaging throat at one end and having a pair of extending legs at the opposite end thereof wherein one of said extending legs terminates in a tang engaging terminal, and a second of said extending legs terminates at a hanger to engage one of the multiple turns of the coil spring on the other leg thereof so that said hooks are engaged by equal and opposite tension forces transferred to said coil spring.

2. The apparatus of claim 1 wherein said coil spring is formed with a central axis therethrough and said turns are formed around said axis, and said coil turns have a common helical lead.

3. The apparatus of claim 2 wherein said coil spring is placed in compression by the forces applied by said hooks, so that said coil spring is compressed along the axis thereof, and said coil spring, in the event of catastrophic failure remains captured and held by said pair of hooks.

4. The apparatus of claim 1 wherein each of said hooks comprises a U-shaped load engaging throat between said pair of extending legs and said legs terminate at an end opposite from said throat and said legs and throat lie in a common plane.

5. The apparatus of claim 4 wherein said tang engaging terminal comprises an integral bent portion comprising an eyelet for engaging one said tang on said coil spring within said eyelet.

6. The apparatus of claim 5 wherein said coil spring, when viewed along the axis thereof, locates said tangs so that said tangs, when engaged with said pair of similar hooks, holds said hooks in planes which are approximately at right angles.

7. The apparatus of claim 6 wherein said planes remain at approximately right angles when said equal and opposite tension forces are transferred to said coil spring.

8. The apparatus of claim 5 wherein an axis through said eyelet is offset from said common plane.

9. The apparatus of claim 5 wherein said hangar is formed within said common plane.

10. The apparatus of claim 1 wherein said legs are parallel.

11. A method of applying a cable tension load compressively to a coil spring so that the load is evenly applied on the coil spring to prevent spring bowing, and the method comprises the steps of:

(a) forming the coil spring with a central axis centered in the turns of the coil spring and the spring is terminated at top and bottom turns, the top turn defining a top tang and the bottom turn defining a bottom tang;

(b) positioning first and second hooks at right angles within said coil spring wherein each of said hooks incorporates a pair of legs and one of said pair of legs terminates with an outwardly extending leg portion enabling said leg portion to reach over either the top or bottom turns of said coil spring, respectively, and further wherein the other of the pair of legs terminates in an outwardly extending eyelet enabling the leg portion to engage the top tang or the bottom tang, respectively; and (c) engaging the leg portions with the top and bottom turns of said coil spring so that said hooks remain at approximately right angle planes with respect to each other.

12. The method of claim 11 wherein said hooks remain at approximately right angles as said cable tension is varied.

13. The method of claim 11 comprising the additional steps of:

(a) terminating a first of said pair of leg portions with a hangar formed within a common plane defined by said legs and a throat joining said legs;

(b) terminating a second of said pair of leg portions with an eyelet, wherein an axis through and perpendicular to a plane of said eyelet is offset from said common plane; and (c) engaging said top and bottom turns by engaging said hangar and said eyelet with tangs protruding from said top and bottom turns.

14. The method of claim 11 including the additional step of capturing said coil spring with said hooks in the event of catastrophic failure of said coil spring.

15. The method of claim 11 comprising the additional step of maintaining said pair of legs of each hook parallel.

16. A hook for engaging a coil spring, wherein the hook comprises a pair of legs terminating at one end with a load engaging U-shaped throat and at the opposite end thereof with a pair of leg ends wherein the two leg ends are formed to extend outwardly to a diameter greater than the inside diameter of a coil spring to be engaged by said coil hook, wherein one of the two leg ends comprises a tang engaging eyelet and the other leg end comprises a coil turn engaging hangar, and wherein the tang and the hangar lie in perpendicular planes.

17. The hook of claim 16 wherein said pair of legs and said U-shaped throat lie in a common plane.

18. The hook of claim 16 wherein an axis through said eyelet is offset from said common plane.

19. The hook of claim 16 wherein said hangar is within said common plane.

* * * * *